(12) United States Patent
Polehn et al.

(10) Patent No.: US 9,972,324 B2
(45) Date of Patent: May 15, 2018

(54) PERSONAL ASSISTANT APPLICATION

(71) Applicants: Verizon Patent and Licensing Inc., Basking Ridge, NJ (US); Cellco Partnership, Basking Ridge, NJ (US)

(72) Inventors: Donna L. Polehn, Kirkland, WA (US); Lalit R. Kotecha, San Ramon, CA (US); Patricia R. Chang, San Ramon, CA (US); Deepak Kakadia, Antioch, CA (US); John F. Macias, Antelope, CA (US); Priscilla Lau, Fremont, CA (US); Yee Sin Chan, San Jose, CA (US); David Chiang, Fremont, CA (US); Thomas W. Haynes, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 196 days.

(21) Appl. No.: 14/152,326

(22) Filed: Jan. 10, 2014

(65) Prior Publication Data
US 2015/0199401 A1   Jul. 16, 2015

(51) Int. Cl.
| | | |
|---|---|---|
| G10L 15/22 | (2006.01) |
| G10L 17/10 | (2013.01) |
| G10L 17/22 | (2013.01) |
| G06K 9/00 | (2006.01) |

(52) U.S. Cl.
CPC .......... *G10L 17/22* (2013.01); *G06K 9/00671* (2013.01); *G10L 15/22* (2013.01); *G10L 17/10* (2013.01)

(58) Field of Classification Search
CPC ........ G06F 17/30091; G06F 17/30424; G06K 9/00221; G06K 9/00671; G10L 17/22; G10L 15/22; G10L 17/10
See application file for complete search history.

(56) References Cited

U.S. PATENT DOCUMENTS

| | | | |
|---|---|---|---|
| 2006/0013446 A1* | 1/2006 | Stephens ............ | G07C 9/00158 382/115 |
| 2007/0071290 A1* | 3/2007 | Shah .................. | G06K 9/00288 382/118 |
| 2008/0088698 A1* | 4/2008 | Patel ........................ | H04N 7/15 348/14.09 |
| 2008/0287060 A1* | 11/2008 | Ramsten .............. | H04B 5/0006 455/41.1 |
| 2008/0317298 A1* | 12/2008 | Shah .................. | G06K 9/00268 382/118 |
| 2009/0060288 A1* | 3/2009 | Myers ................ | G06K 9/00288 382/118 |
| 2009/0060289 A1* | 3/2009 | Shah .................. | G06K 9/00979 382/118 |

(Continued)

Primary Examiner — Jorge A Casanova

(57) ABSTRACT

A mobile device may receive user input for requesting personal information for a subject in proximity of a mobile device and based on the user input, selecting one of available functions. The functions may include a first function for obtaining personal information using a first identifier. The functions may also include a second function for obtaining the personal information using the first identifier. The mobile device may output the personal information as an image to a display or as speech to speaker.

20 Claims, 9 Drawing Sheets

(56) References Cited

U.S. PATENT DOCUMENTS

| | | | |
|---|---|---|---|
| 2011/0026781 A1* | 2/2011 | Osadchy | H04L 9/008 382/118 |
| 2011/0038512 A1* | 2/2011 | Petrou | G06F 17/30256 382/118 |
| 2011/0058743 A1* | 3/2011 | Myers | G06K 9/00288 382/190 |
| 2011/0231757 A1* | 9/2011 | Haddick | G02B 27/017 715/702 |
| 2012/0076368 A1* | 3/2012 | Staudacher | G06K 9/00315 382/118 |
| 2013/0079037 A1* | 3/2013 | Dobyns | H04W 4/008 455/456.3 |
| 2013/0156274 A1* | 6/2013 | Buchmueller | G06Q 50/01 382/118 |
| 2014/0079298 A1* | 3/2014 | Shah | G06K 9/00221 382/118 |
| 2014/0100925 A1* | 4/2014 | Popescu | G06Q 30/01 705/14.4 |
| 2015/0319224 A1* | 11/2015 | Rong | G06Q 30/02 709/217 |

\* cited by examiner

PERSONAL ASSISTANT APPLICATION

BACKGROUND

With advances in information technology, hand-held communication devices have gained computational power. Today, some of the devices are capable of enhancing audio and visual information with additional information and providing the enhanced audio and visual input to the user in real-time.

DETAILED DESCRIPTION

The following detailed description refers to the accompanying drawings. The same reference numbers in different drawings may identify the same or similar elements.

As used herein, the term "object" may include not only inanimate objects or things (e.g., a tree, rock, building, etc.) but also people, animals, or other living organisms or moving objects. As used herein, the term "subject" may include a person whose image is within the image of a scene.

In the following, a personal assistant application may identify a subject that a user views or listens to using a device on which the personal assistant applicant is installed (e.g., smart phone, wearable computer, etc.). The application may retrieve information about the subject and provide the information to the user on a display or speaker associated with the device. In addition, the personal assistant application may store, at a remote device, information input by the subject.

Figure 1:
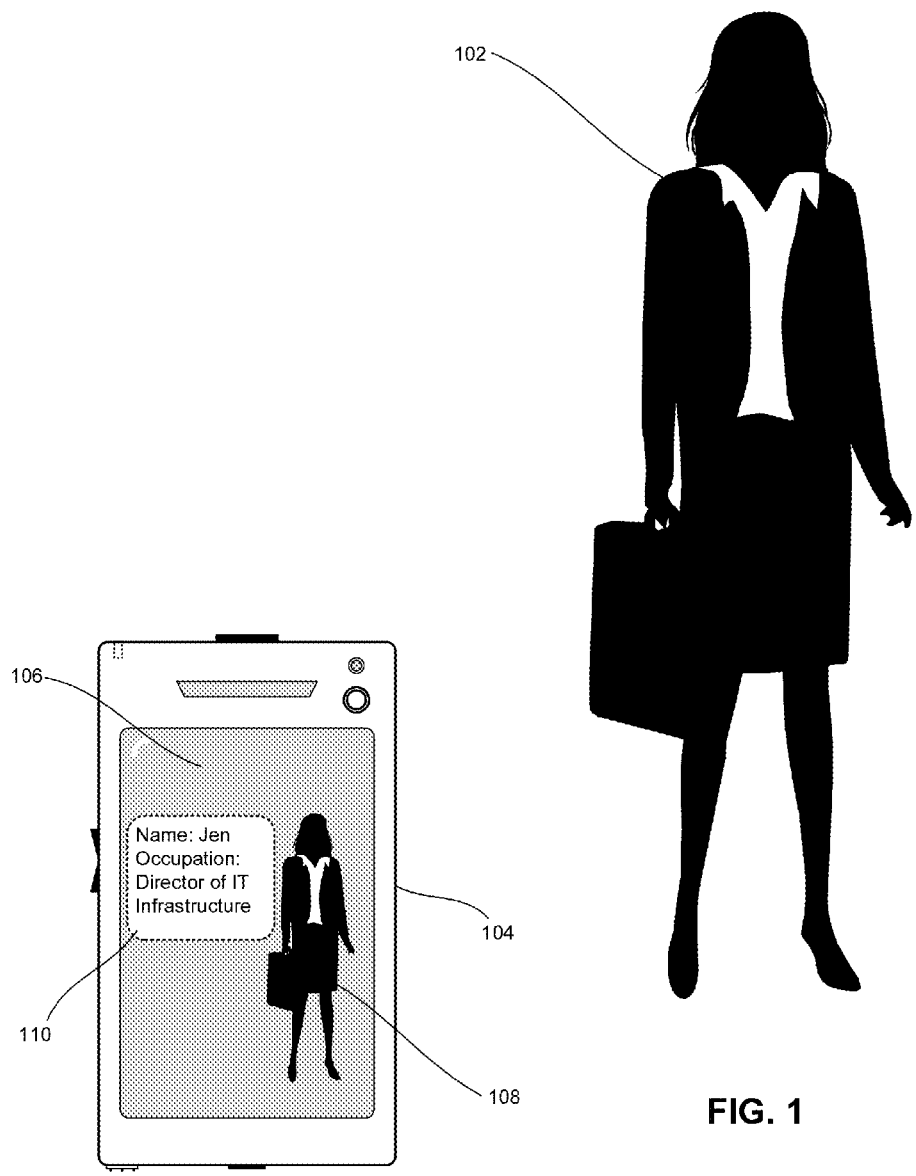
FIG. 1 illustrates an overview of concepts described herein according to one implementation.

FIG. 1 illustrates the concepts described herein. Assume that John (not shown) is scheduled to speak with Jennifer 102, a representative from John's corporate client. Also assume that John met Jennifer a couple of times, but does not remember her name. Accordingly, John decides to use a personal assistant application installed on his portable user device 104. John launches the application on his portable user device 104, and discreetly obtains an image of Jennifer 102 via portable user device 104. Portable user device 104 provides the image to the application. The application uses the image to obtain information about Jennifer; and shows, on display 106 of portable user device 104, both Jennifer's image 108 and the obtained information 110. John scans display 106, learns Jennifer's name, and introduces himself, "Jennifer, nice to meet you again." In FIG. 1, although portable user device 104 is illustrated as a smart phone, in a different implementation, another type of device may take the place of a smart phone, such as a wearable computer (e.g., Google Glass™).

Figure 2:
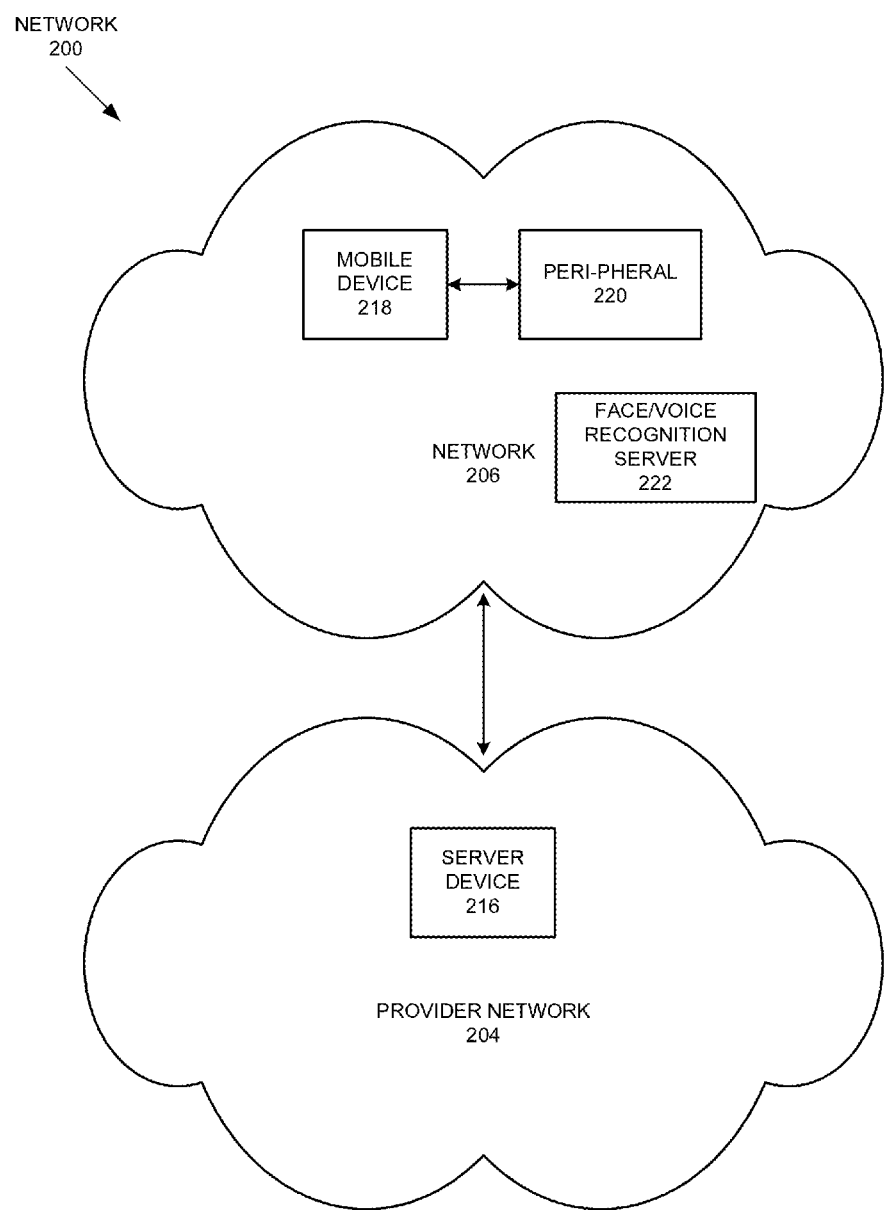
FIG. 2 shows an exemplary network in which the concepts described herein may be implemented.

FIG. 2 depicts an exemplary network 200 in which the concepts described herein may be implemented. As shown, network 200 may include a provider network 204 and network 206. Provider network 204 may include one or more packet switched networks, such as an Internet protocol (IP) based network, a local area network (LAN), a wide area network (WAN), a personal area network (PAN), an intranet, a cellular network, a fiber-optic network, or another type of network that is capable of conveying data. Provider network 204 may also include a circuit-switched network, such as a public-switched telephone network (PSTN) and a support system for a PSTN, such as Signaling System No. 7 (SS7), as well as Voice-over-IP (VoIP) network, such as a Session Initiation Protocol (SIP) network.

Provider network 204 may provide network services to its customers, including services that are associated with the personal assistant application. In providing the services, provider network 204 may allow each of its customer/users to opt-in or opt-out of allowing others in provider network 204 from accessing and/or using their personal information.

As shown in FIG. 2, provider network 204 may include a server device 216. Server device 216 may collect information about people, places, and/or things and store them in its database. Server device 216 may send/receive messages to/from a personal assistant application, installed on one or more devices in network 206, over networks. For example, server device 216 may receive a query regarding a subject, along with a key (or information for obtaining a key). In response, server device 216 may use the key (provided in the query or obtained from the information provided in the query) to perform a lookup of data pertaining to the subject. Server device 216 may provide the data to the personal assistant application. In some situations, server device 216 may store personal information, about the subject, sent from the personal assistant application in its database.

Server device 216 may also send images of faces ("face images"), information representing speech ("voice data"), and symbol strings (e.g., alphanumeric and special characters) that identify the faces/voices to a face/voice recognition server 222.

Network 206, like network 204, may include one or more packet switched networks, such as an IP based network, a LAN, a WAN, a PAN, an intranet, a cellular network, a fiber-optic network, or another type of network. Network 206 may also include a circuit-switched network, such as a PSTN and/or a service provider network, which in turn includes SS7 network, a SIP network, etc. In addition, network 206 may include the Internet. Network 206, in conjunction with network 204, may allow devices in network 204 to connect to other devices also attached 200, via network 206.

As shown in FIG. 2, network 206 may include a mobile device 218, a peripheral 220, and a face/voice recognition server 222. Mobile device 220 may include a smart phone, a tablet computer, a personal communications system (PCS) terminal, a personal digital assistant (PDA), a laptop, or another portable communication device. Mobile device 218 may communicate with other devices via one or more communication towers (not shown) using a wireless communication protocol, e.g., GSM (Global System for Mobile Communications), CDMA (Code-Division Multiple Access), WCDMA (Wideband CDMA), IEEE 802.11x, etc. Mobile device 218 may be associated with a phone number.

Peripheral device 220 may include a headset, a pair of display glasses, a wearable computer (e.g., Google Glasses™), etc. Depending on the implementation, peripheral device 220 may be connected to mobile device 218 via a cable or paired wirelessly to mobile device 218 (i.e., coupled by a communication link, such as a Bluetooth communication link).

Face/voice recognition server 222 may receive, from server device 216, face images, voice data, and identifiers that are associated face images/voice. In addition, face/voice recognition server 222 may store: the face images along with their corresponding identifiers; and voice data along with their corresponding identifiers. When face/voice recognition server 222 receives a request from mobile device 218 or peripheral 220 to identify a face or a voice, face/voice recognition server 222 may use a face image and/or voice data provided in the query to retrieve a record with the matching face image/voice data. Face/voice recognition server 222 may send the identifier in the record to mobile device 218, along with other relevant statistics (e.g., percent likelihood of the match being correct).

In FIG. 2, a personal assistant application may be installed on mobile device 218 and/or peripheral device 220. In using the personal assistant application, a user may capture a face image or voice data of a subject via mobile device 218/peripheral device 220 in its proximity. Mobile device 218/peripheral device 220 may then send a first query, which includes the captured face image or voice data, to face/voice recognition server 222. In response, face/voice recognition server 222 may reply to mobile device 218/peripheral 220 with a message that includes an identifier corresponding to the face image/voice data. When peripheral 220 obtains the identifier from face/voice recognition server 222, peripheral 220 may relay the identifier, the face image, and the voice data to mobile device 218 via, for example, a Bluetooth communication link. It is possible that face/voice recognition server 222 is unable to provide an identifier corresponding to the face image/voice data to mobile device 218 or peripheral 220.

Upon obtaining the identifier from either face/voice recognition server 222 or peripheral 220, mobile device 218 may send a request for personal data to server device 216. The request may include the identifier, if available, from face/voice recognition server 222, location information for mobile device 222, and/or a field device ID of a device carried by the subject. Using the information/data provided in the request as key(s), server device 216 may look up a corresponding record and retrieve personal information stored therein. Server device 222 may forward the retrieved personal information to mobile device 218. In response, mobile device 218 may either display the personal information on its own display or via peripheral 220. Alternatively or additionally, mobile device 218 may convey the information via artificial speech though its own speakers or peripheral 220.

In some implementations, mobile device 218 may not request face/voice recognition server 222 to identify a face/voice. In these implementations, mobile device 218/peripheral 220 may not send a first query to face/voice recognition server 222. Instead, mobile device 218 may bundle the captured face image, voice data, location information, and/or field device ID in the request to server device 216. In response, server device 216 may send the bundled information to face/voice recognition server 222 to obtain the identifier for the subject. Thereafter, server device 216 may use the location information, field device ID, and the identifier to retrieve the personal information in manner previously described.

Depending on the implementation, network 200 may include additional, fewer, different, and/or a different arrangement of network devices than those illustrated in FIG. 2. In one implementation, network 200 may include hundreds, thousands, or millions of mobile devices 21, phones 214. In a different example, although each of networks 204 and 206 is illustrated in FIG. 2 as including only one or two devices, in an actual implementation, networks 204 may include other network devices, such as bridges, routers, switches, etc.

Further, depending on the implementation, functionalities of a single device in FIG. 2 may be implemented in multiple devices (e.g., server device 216 may be implemented by multiple devices). Conversely, functions of multiple devices may be combined in a single device (e.g., functionalities of mobile device 218 and server device 216 may be implemented in mobile device 218).

Figures 3A, 3B:
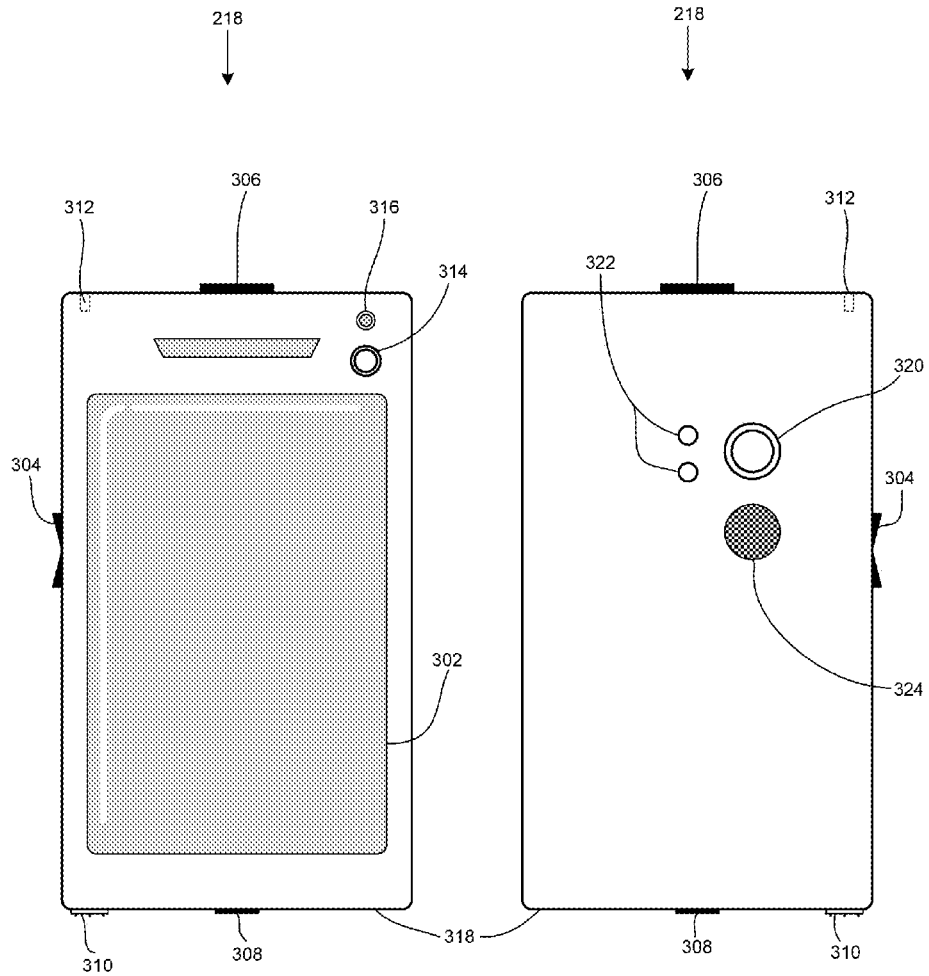
FIGS. 3A and 3B are front and rear views of the exemplary mobile phone of FIG. 2 according to one embodiment.

FIGS. 3A and 3B are front and rear views, respectively, of mobile device 218 according to one implementation. As shown in FIGS. 3A and 3B, mobile device 218 may include a display 302, volume rocker 304, awake/sleep button 306, microphone 308, power port 310, speaker jack 312, front camera 314, sensors 316, housing 318, rear camera 320, light emitting diodes 322, and speaker 324. Depending on the implementation, mobile device 218 may include additional, fewer, different, or different arrangement of components than those illustrated in FIGS. 3A and 3B.

Display 302 may provide visual information to the user. In one implementation, a personal assistant application installed on mobile device 218 may show: the images, of a subject, received by mobile device 218 via rear camera 320; and information that the personal assistant application obtains about the subject (e.g., in text). Volume rocker 304 may permit a user to increase or decrease speaker volume. Awake/sleep button 306 may put mobile device 318 into or out of the power-savings mode.

Microphone 308 may receive audible information and/or sounds from the user and from the surroundings. Power port 310 may allow power to be received by mobile device 318, either from an adapter (e.g., an alternating current (AC) to direct current (DC) converter) or from another device (e.g., computer).

Speaker jack 312 may include a plug into which one may attach speaker wires (e.g., headphone wires), so that electric signals from mobile device 318 can drive the speakers, to which the speaker wires run from speaker jack 312. Front camera 314 may enable the user to view, capture, store, and process images of a subject in/at front of mobile device 318. In some implementations, front camera 314 may be coupled to an auto-focusing component or logic and may also operate as a sensor.

Sensors 316 may collect and provide, to mobile device 218, information pertaining to mobile device 218 (e.g., movement, orientation, etc.) and/or information that is used to aid a user in capturing images (e.g., for providing information for auto-focusing). Sensors 316 may include, for example, a gyroscope, an accelerometer, a magnetometer (e.g., a compass), etc. Some sensors may be affixed to the exterior of housing 318, as shown in FIG. 3A, and other sensors may be inside housing 318. Housing 318 may provide a casing for components of mobile device 218 and may protect the components from outside elements.

Rear camera 320 may enable the user to view, capture, store, and/or process images of a subject at the back of mobile device 218. Light emitting diodes 322 may operate as flash lamps for rear camera 320. Speaker 324 may provide audible information from mobile device 218 to a user/viewer of mobile device 218.

Figure 4:
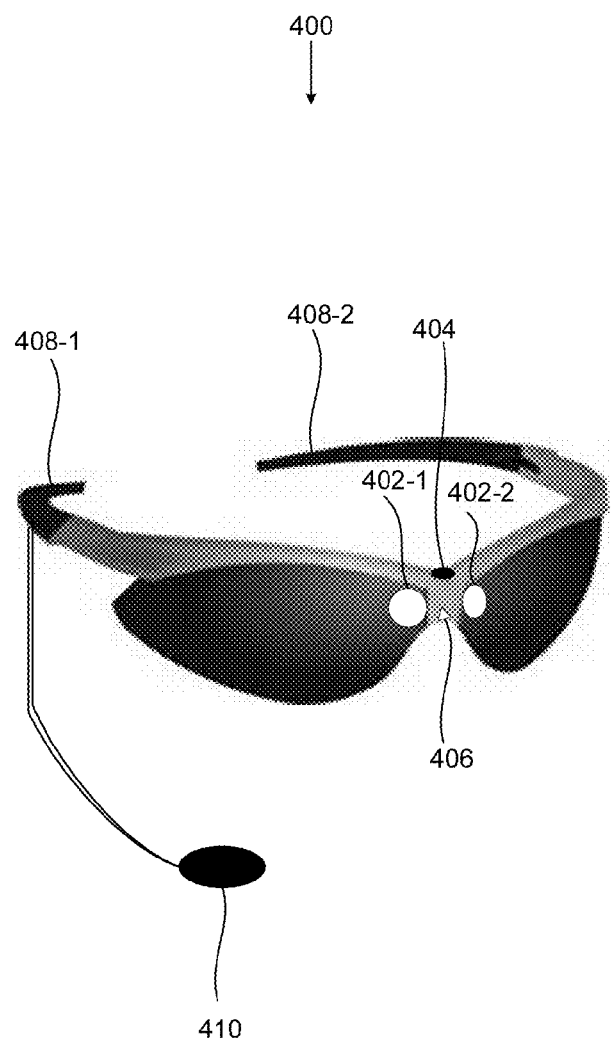
FIG. 4 illustrates the mobile device of FIG. 2 according to another embodiment.

FIG. 4 illustrates mobile device 218 or a peripheral 220 according to another embodiment. In FIG. 4, mobile device/peripheral 218/220 is shown as a wearable display device 400. As shown, wearable display device 400 may include projectors 402-1 and 402-2, front camera 404, location unit 406, speakers 408-1 and 408-2, and microphone 410.

Projectors 402-1 and 402-2 may provide images for viewing. In some implementations, projectors 402-1 and 402-2 may project images on glass/display screens. In other implementations, projectors 402-1 and 402-2 may project the images directly onto the eyes of the user. In some implementations, projectors 402-1 and 402-2 may operate in combination to render three-dimensional images of the information in real time or near real time.

Front camera 404 may receive images from surroundings at the front of device 400. Location unit 406 may determine the position and/or orientation of wearable display device 400. In addition, location unit 406 may determine distances from wearable display device 400 to one or more subjects in a field of view of wearable display device 400. Speakers 408-1 and 408-2 may provide audio output of wearable display device 400 to the user. In some implementations, speakers 408-1 and 408-2 may be implemented as bone conduction speakers. Microphone 410 may receive audible information and/or sounds from the user and from the surroundings.

Depending on the implementation, wearable display device 400 may include additional, fewer, different, or different arrangement of components than those illustrated in FIG. 4. For example, in one implementation, wearable display device 400 may exclude projectors 402-1 and 402-2 and/or display screens, and include non-transparent LED screens. Each of the LED screens may face each of the viewer's eyes. In such an implementation, rather than having the user view some information overlaid on the real-world images, wearable display device 400 may combine all viewable information before providing the images on its LED screens.

In another example, wearable display device 400 may include eye-tracking cameras. In this implementation, the eye-tracking cameras may collect information about the direction of the user's gaze and use the information to select a particular image in which the user may be interested. For example, assume that John and Mary are in front camera 404's field of view and that the user gazes at Mary for longer than a specified amount of time. In response, wearable display device 400 may detect the user's gaze, infer that the user is interested in information about Mary, identify Mary, retrieve information about Mary, and provide the information to the user via either projectors 402-1 and 402-2 or via speakers 408-1 and 408-2.

Figure 5:
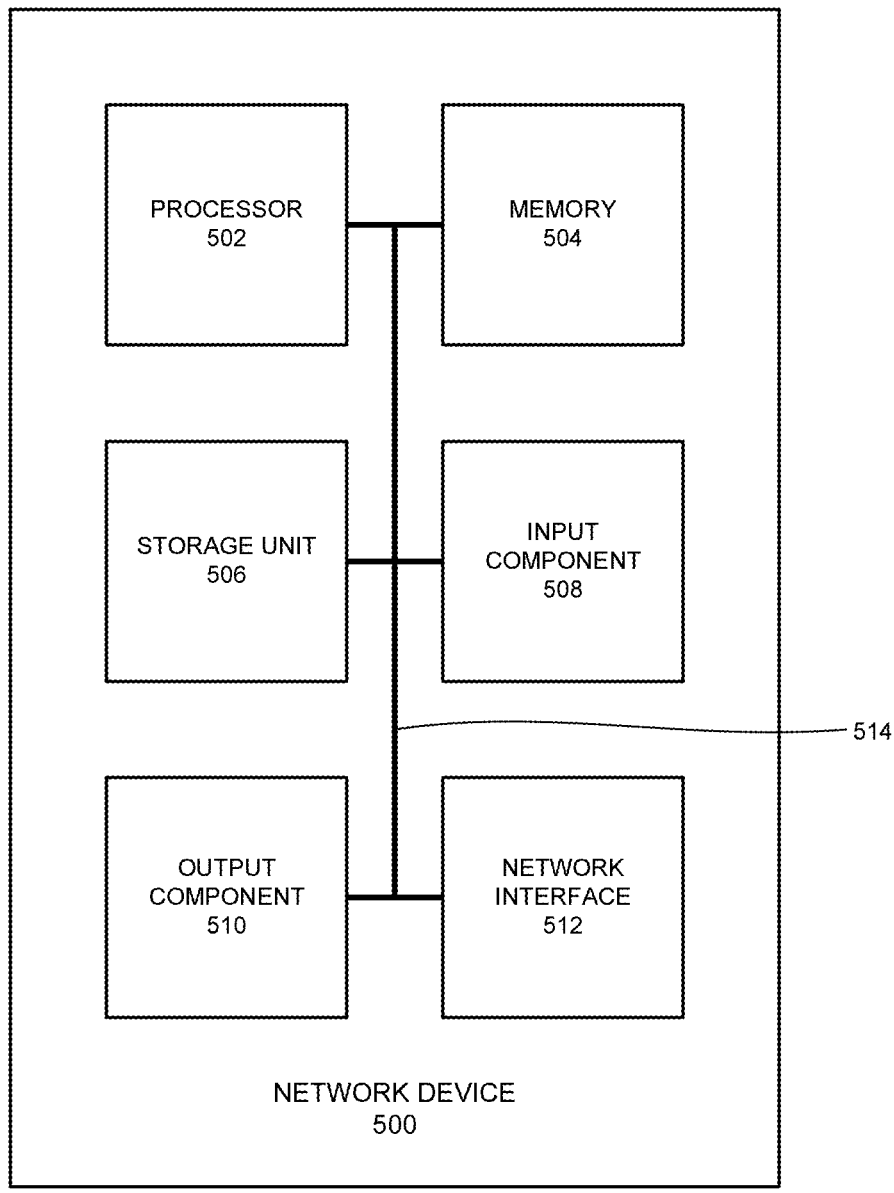
FIG. 5 shows exemplary components of a network device of FIG. 2.

FIG. 5 is a block diagram of exemplary components of a network device 500. Network device 500 may correspond to any of devices 210-220. As shown, network device 500 may include a processor 502, memory 504, storage unit 506, input component 508, output component 510, network interface 512, and communication path 514. In different implementations, network device 500 may include additional, fewer, different, or different arrangement of components than the ones illustrated in FIG. 5. For example, network device 500 may include line cards for connecting to external buses.

Processor 502 may include a processor, a microprocessor, an Application Specific Integrated Circuit (ASIC), a Field Programmable Gate Array (FPGA), and/or other processing logic (e.g., embedded devices) capable of controlling network device 500. Memory 504 may include static memory, such as read only memory (ROM), and/or dynamic memory, such as random access memory (RAM), or onboard cache, for storing data and machine-readable instructions (e.g., programs, scripts, etc.). Storage unit 506 may include a floppy disk, CD ROM, CD read/write (R/W) disc, and/or flash memory, as well as other types of storage devices (e.g., hard disk drive) for storing data and/or machine-readable instructions (e.g., a program, script, etc.). As used herein, the term "computer-readable medium" may include memory 504 or storage unit 506.

Input component 508 and output component 510 may provide input and output from/to a user to/from network device 500. Input/output components 508 and 510 may include a display screen, a keyboard, a mouse, a speaker, a microphone, a camera, a DVD reader, Universal Serial Bus (USB) lines, and/or other types of components for converting physical events or phenomena to and/or from signals that pertain to network device 500.

Network interface 512 may include a transceiver (e.g., a transmitter and a receiver) for network device 500 to communicate with other devices and/or systems. For example, via network interface 512, network device 500 may communicate over a network, such as the Internet, an intranet, a terrestrial wireless network (e.g., a WLAN, WiFi, WiMax, etc.), a satellite-based network, optical network, etc. Network interface 512 may include a modem, an Ethernet interface to a LAN, and/or an interface/connection for connecting network device 500 to other devices (e.g., a Bluetooth interface).

Communication path 514 may provide an interface through which components of network device 500 can communicate with one another.

Network device 500 may perform the operations described herein in response to processor 502 executing software instructions stored in a non-transient computer-readable medium, such as memory 504 or storage unit 506. The software instructions may be read into memory 504 from another computer-readable medium or from another device via network interface 512. The software instructions stored in memory 504 or storage unit 506, when executed by processor 502, may cause processor 502 to perform processes that are described herein.

Figure 6:
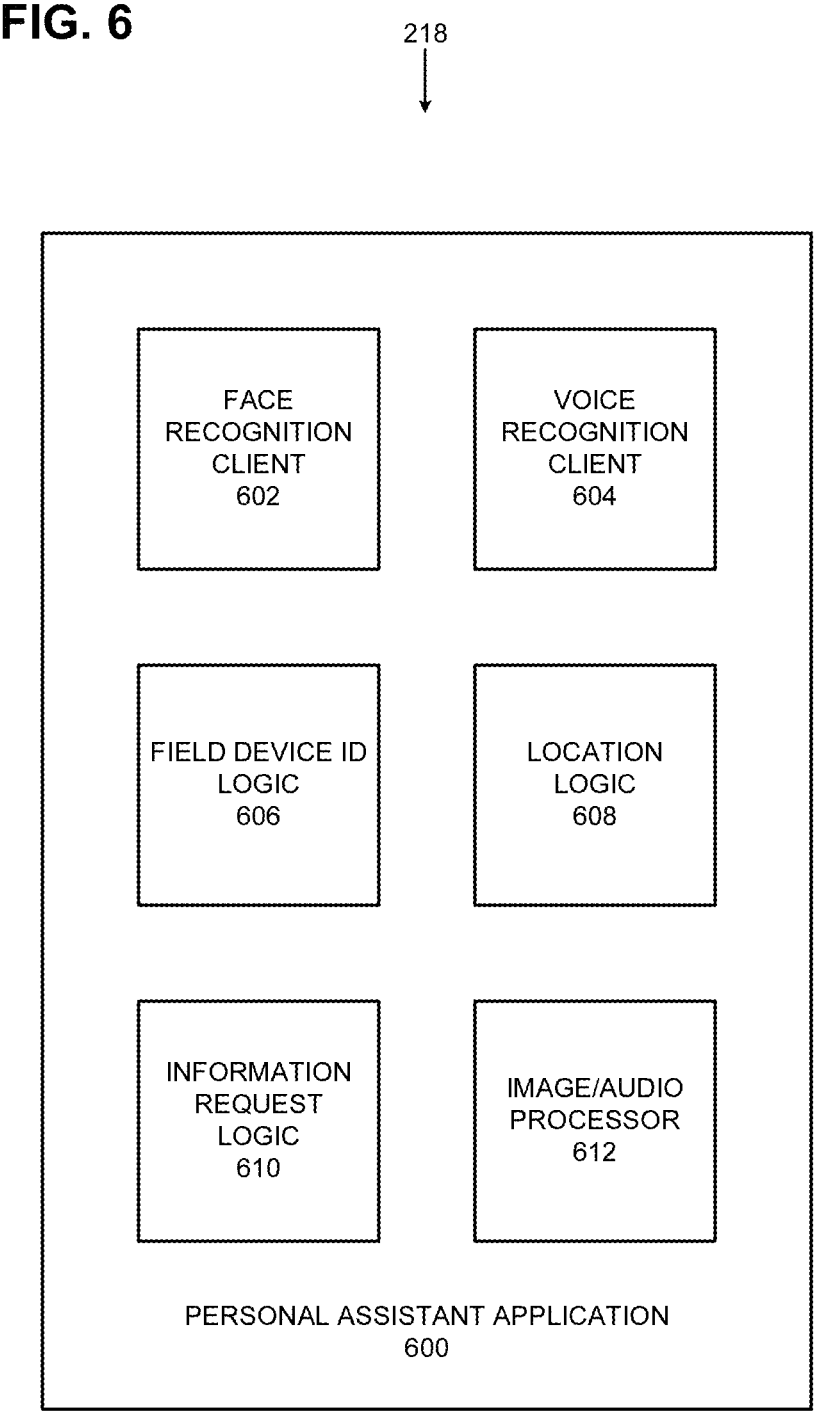
FIG. 6 is a block diagram of exemplary functional components of an exemplary personal assistant application installed on the mobile device of FIG. 5.

FIG. 6 is a block diagram of exemplary functional components of mobile device 218. As shown, mobile device 218 may include personal assistant application 600, which in turn may include face recognition client 602, voice recognition client 604, field device identification (ID) logic 606, location logic 608, information request logic 610, and image/audio processor 612. Depending on the implementation, mobile device 218 and personal assistant application 600 may include additional, fewer, different, or a different arrangement of components than those illustrated in FIG. 6. For example, mobile device 218 may include a phone application, browser, texting application, music application, photo application, etc.

Face recognition client 602 may send, given an image of a face, a request to face/voice recognition server 222 to identify the face. The request may include a face image of the subject. Upon receipt of an identifier corresponding to the face image from face/voice recognition server 222, face recognition client 602 may provide the identifier to information request logic 610.

Voice recognition logic 604 may send, given a voice, a request to face/voice recognition server 222 to identify the voice. The request may include voice data of the subject. Upon receipt of an identifier corresponding to the voice data from face/voice recognition server 222, voice recognition client 604 may provide the identifier to information request logic 610.

Field device ID logic 606 may detect a radio frequency (RF) ID or near-field communication (NFC) tag of a device near mobile device 218 and obtain information that identifies the device. As used herein, the terms "field device ID," "field device information" and "field device data" may refer to such information.

Location logic 608 may obtain information that identifies the location and the orientation of mobile device 218. As used herein, the term "location data" or "location information" may refer to information or data identifying the location and/or orientation of mobile device 218. In some implementations, location logic 608 may obtain the location information/data from a Global Positioning System (GPS) receiver included in mobile device 218, as well as its sensors, such as a gyroscope, accelerometer, a compass, and/or other sensors within mobile device 218. In other implementations, location logic 608 may obtain some or all of location information from base stations or other network devices.

Information request logic 610 may receive an identifier for a subject from face recognition client 602 and/or voice recognition client 604, a field device ID from field device ID logic 606, and location information from location logic 608. As used herein, the terms "key data" or "key information" may refer to one or more identifiers for subject(s), a field device ID, and/or location information. Information request logic 610 may then generate a request that includes the key data, and forward the request to server device 216. In response, server device 216 may return information about the subject corresponding to the key data. As used herein, the term "personal data" or "personal information" may refer to data/information, about a subject, provided by server device 216, whether the provided information is actually personal in nature or not.

In some implementations, mobile device 218 may include a local database in which personal data/information is stored. In such implementations, information request logic 610 may use key data from components 602-608 to retrieve personal data from the local database. Information request logic 610 may then provide the retrieved, personal data to image/audio processor 612.

Image/audio processor 612 may receive personal data from information request logic 610, and output the received, personal data. In one implementation, image/audio processor 612 may generate one or more graphical objects for presenting the personal data to the user. Depending on the implementation, image/audio processor 612 may overlay the graphical objects on or may combine the graphical objects with other display objects (e.g., combine the image of a subject with text information pertaining to the subject). The overlaid or combined graphical objects may be output to the display of mobile device 218.

In a different implementation, image/audio processor 612 may generate one or more audio objects (e.g., speech) for conveying the personal data to the user. The audio object may be used to generate speech output at the speaker(s) of mobile device 218 or at peripheral 220.

Figure 7:
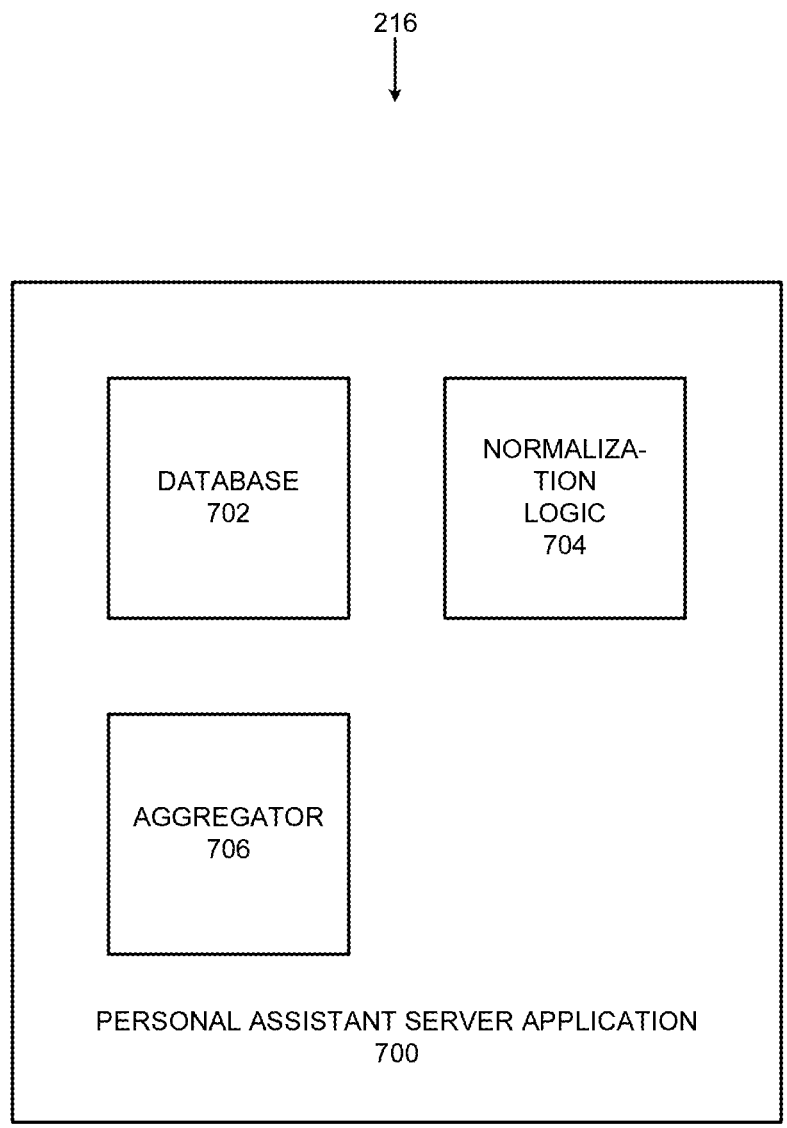
FIG. 7 is a block diagram of exemplary functional components of the server device of FIG. 2.

FIG. 7 is a block diagram of exemplary functional components of server device 216. As shown, server device 216 may include personal assistant server application 700, which in turn may include a database 702, normalization logic 704, and aggregator 706. Depending on the implementation, server device 216 and personal assistant server application 700 may include additional, fewer, different or a different arrangement of components than those illustrated in FIG. 7. For example, server device 216 may include an operating system, communication components (e.g., TCP/IP stack), server (e.g., a web server, an email server, etc.), etc.

Database 702 may include information about persons, places, and/or things. More specifically, for example, database 702 may include, for a person, images of the face of the person, voice data of the person, field device IDs of devices that belong to the person, and/or location coordinates of the person's device(s) (e.g., longitude and latitude). A client may search database 702 by using key data as well as an image and voice data.

As already discussed, in some implementations, mobile device 218 may send, as part of key data in its request for information for a subject, face images and/or voice data, rather than an identifier for the subject. For example, assume that mobile device 218 belongs to John, and that John is walking toward Jennifer; that personal assistant application 600 is running on mobile device 218; and that mobile device 218 captures an image of Jennifer's face. In the example, mobile device 218 sends a query to database 702 on server device 216, requesting database 702 to lookup information about Jennifer. In this example, the key data in the query includes Jennifer's image captured by mobile device 218. Accordingly, database 702 uses Jennifer's image as a key to lookup personal information about Jennifer. Database 702 successfully matches one of Jennifer's images in the query with an image in one of its records, and retrieves personal information provided in the record. The retrieved personal information includes Jennifer's full legal name, Jennifer's current occupation, past job titles, the name of college Jennifer attended, etc. Database 702 sends the retrieved information to personal assistant application 600 on mobile device 218. Personal assistant application 600 displays the information to John.

In one implementation, in performing a query, database 702 may use different types of information provided in the query in the order of increasing computational costs, for performing a searches using each type of information. For example, database 702 may perform a search based on a field device ID, prior to performing searches using face images or voice data.

Database 702 may send face images, voice data, and identifiers that are associated with the face images/voice data, to face/voice recognition server 222 and request face/voice recognition server 222 to store the face images, voice data, and the identifiers. This allows face/voice recognition server 222 to build up a library of face images/voice data, for providing face/voice recognition service to, for example, mobile device 218 or peripheral device 220.

Normalization logic 704 may receive face images, voice data, and/or field device ID and may output normalized face images, voice data, and/or field device ID. The normalized information may be stored in database 702, be used to perform lookups (e.g., in database 702 or at face/voice recognition server 222). For example, when mobile device 218 sends a query to database 702, database 702 may normalize the key data provided in the query, before using the key data to perform lookups. The normalization may include elimination of noise, image translation (e.g., centering an image), /rotations (e.g., aligning an image to vertical axis), audio filtering, formatting field device ID, etc.

Aggregator 706 may access different informational sources, collect information that pertains to different people, normalize the information via normalization logic 704, and store the normalized information in database 702.

In collecting data, aggregator 706 may contact, for example, social media sites (e.g., Facebook™), professional association sites (e.g., Linkedin™), content sites (e.g., YouTube™, Vimeo™, etc.), a corporate/campus directory (if server device 216 serves an entity to which the directory belongs and has an access to the directory), and/or other sites and download personal information in various forms (e.g., plain text, vCard, html, etc.). In some implementations, aggregator 706 may access sites that post pictures of those with criminal records (e.g., public record sites, governmental/law enforcement sites). This may allow personal assistant application 600 to identify and retrieve information about those with criminal records.

In addition, aggregator 706 may access location service sites or servers that track the locations of mobile devices. Periodically or based on need, aggregator 706 may access the services/servers to obtain/download location information for mobile devices.

Figure 8A:
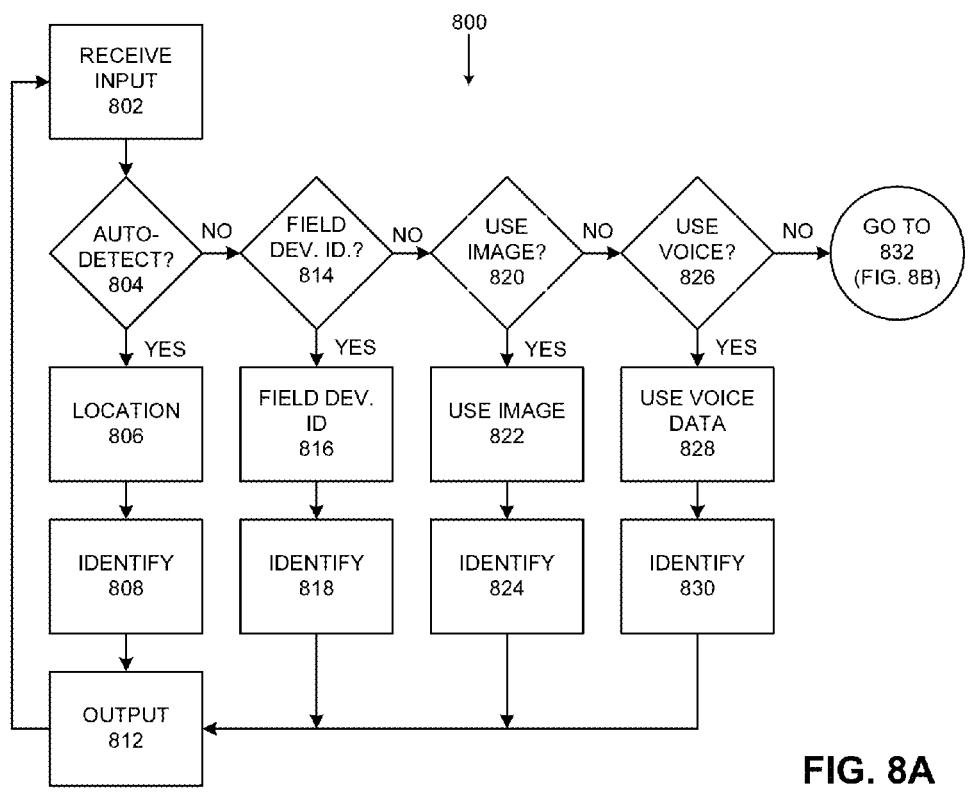
FIGS. 8A and 8B are flow diagrams of an exemplary process associated with the personal assistant application of FIG. 6.
Figure 8B:
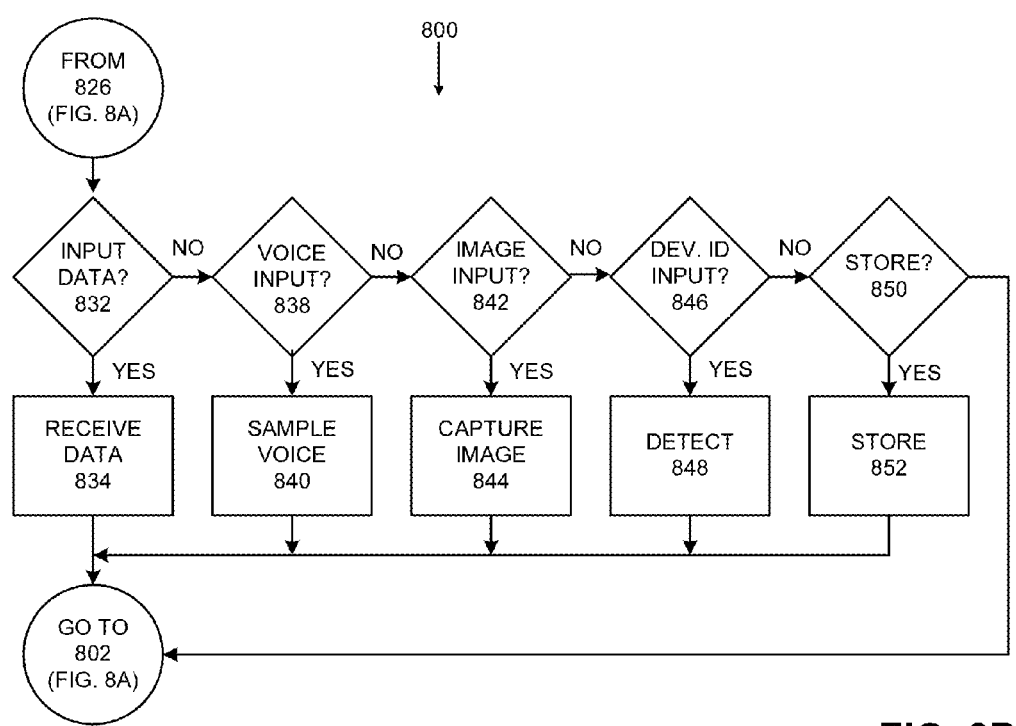

FIGS. 8A and 8B are flow diagrams of an exemplary process 800 that is associated with personal assistant application 600 and/or personal assistant server application 700. Assume that personal assistant application 600 is running on mobile device 218. Also, assume that personal assistant application 600 has presented the user with a menu for selecting different types of assistance for retrieving information about a particular subject.

As shown, process 800 may include personal assistant application 600 receiving user input (e.g., selection of a menu option) (block 802). Personal assistant application 600 may determine whether the user has selected auto-detection option (block 804). If so (block 804: yes), personal assistant application 800 may determine the location of mobile device 218 (block 806).

Personal assistant application 600 may identify the subject based on the location information (block 808). For example, personal assistant application 600 may form a query that includes the location information as its key data. Personal assistant application 600 may send the query to personal assistant server application 700, which may use the location information in the query to retrieve, from database 702, the identity of the device (and therefore, the identity of the subject) that is in proximity of mobile device 218. If there is a mobile device in the proximity of mobile device 218, personal assistant server application 700 may return the corresponding record to mobile device 218. Otherwise, the attempt to identify the subject would fail, and personal assistant server application 700 may send an indication of the failure to mobile device 218.

When personal assistant application 600 receives the result of its query from personal assistant server application 700, personal assistant application 600 may provide either the personal information included in the result or the indication of the failure to identify the subject via its output components (block 812). For example, in one implementation, personal assistant application 600 may provide the personal information via its display screen or peripheral 220. Personal assistant application 600 may then return to block 802.

Returning to block 804, if the user has not selected the auto-detect option (block 804: no), personal assistant application 600 may determine whether the user selected a field device ID option (block 814). If so (block 814: yes), personal assistant application 600 may attempt to scan its surroundings to obtain a field device ID from a nearby device, or wait for the user to take an action (e.g., touch another device with mobile device 218) to obtain a field device ID or an RFID (block 816). Thereafter, personal assistant application 600 may use the field device ID to identify the subject (block 818). If no device is detected, for example, within a prescribed time, personal assistant application 600 may be unable to obtain the field device ID and fail to identify the subject at block 818.

The actions that are performed by personal assistant application at block 818 are similar to those performed by personal assistant application 600 at block 808, except that personal assistant application 600 sends, in the query forwarded to personal assistant server application 700, the field device ID of a device detected by mobile device as the key data rather than the location information. Personal assistant application 600 may then proceed to block 812, to output the result of its actions taken at blocks 816 and 818 (block 812).

Returning to block 814, if the user has not selected the field device ID option (block 814: no), personal assistant application 600 may determine whether the user has selected to use face image option (block 820). If so (block 820: yes), personal assistant application 600 may use a face image of the subject to identify the subject and retrieve information related to the subject (block 822).

To use a face image, personal assistant application 600 may provide the user with a menu for taking a picture (or capturing a video) of the subject. When the user successfully captures a face image of the subject, personal assistant application 600 may send the face image to a face/voice recognition server 222. When face/voice recognition server 222 returns the search result (which is in the form of an identifier), personal assistant application 600 may send a query that includes the identifier as the key data to personal assistant server application 700. Personal assistant server application 700 may then use the identifier to perform a database lookup. Personal assistant server application 700 may forward its search result to personal assistant application 600, which may proceed to block 812.

In some implementations, personal assistant application 600 may not query face/voice recognition server 222. In such implementations, personal assistant application 600 may forward the face image of the subject as the key data to personal assistant server application 700. Personal assistant server application 700 may then use the face image to query face/voice recognition server 222, to obtain an identifier with which its database lookup can be performed.

Returning to block 820, if the user has not selected the use face image option (block 820: no), personal assistant application 600 may determine whether the user has selected the use voice option (block 826). If so (block 826: yes), personal assistant application 600 may use a recording of the voice of the subject to identify the subject and retrieve information related to the subject (block 828).

To use the subject's voice, personal assistant application 600 may provide the user with a menu for capturing speech of the subject. When the user successfully captures the speech as voice data, personal assistant application 600 may send the voice data to a face/voice recognition server 222. When face/voice recognition server 222 returns the search result (which is in the form of an identifier), personal assistant application 600 may send a query that includes the identifier as the key data to personal assistant server application 700. Personal assistant server application 700 may then use the identifier to perform a database lookup. Personal assistant server application 700 may forward its search result to personal assistant application 600, which may proceed to block 812.

Returning to block 826, if the user has not selected the use voice option (block 826: no), personal assistant application 600 may proceed to block 832. With reference to FIG. 8B, at block 832, personal assistant application 600 may determine whether the user has selected a data input option (block 832). If so (block 832: yes), personal assistant application 600 may provide the user with a GUI and receive input from the user (block 834). Via the GUI, the user may provide personal information pertaining to the subject (block 836). Once the user inputs the personal information, personal assistant application 600 may return to block 802.

Returning to block 832, if the user has not selected a data input option (block 832: no), personal assistant application 600 may proceed to block 838. At block 838, personal assistant application 600 may determine whether the user has selected a voice input option (block 838). If so (block 838: yes), personal assistant application 600 may provide the user with a GUI for recording or sampling the subject's voice. Using the GUI, the user may capture a sample of the subject's voice (block 840). After sampling the voice, personal assistant application 600 may return to block 802.

Returning to block 838, if the user has not selected the voice input option (block 838: no), personal assistant application 800 may proceed to block 842. At block 842, personal assistant application 600 may determine whether the user has selected a face image input option (block 842). If the user has selected the face image input option (block 842: yes), personal assistant application 600 may allow the user to capture an image of the face of the subject using mobile device 218. After capturing the face image of the subject (block 844), personal assistant application may return to block 802.

Returning to block 842, if the user has not selected the face image input option (block 842: no), personal assistant application 800 may proceed to block 846. At block 846, personal assistant application 600 may determine whether the user has selected a field device ID input option (block 846). If the user has selected the field device ID input option (block 846: yes), personal assistant application 600 may allow the user to detect an NFC tag, RFID, or another type of device identifier of a device that the subject is carrying, using mobile device 218. After capturing the field device ID (block 844), personal assistant application may return to block 802.

Returning to block 846, if the user has not selected the field device ID input option (block 846: no), personal assistant application 800 may proceed to block 850. At block 850, personal assistant application 600 may determine whether the user selected a store option (block 850). If the user selected the store option (block 850: yes), personal assistant application 600 may send the current information, of the subject, that the user obtained at mobile device 218 to personal assistant server application 700 (e.g., face image, voice data, field device ID, personal information input by the user, etc.). In response, personal assistant server application 700 may store the information in the record corresponding to the subject.

If personal information of a subject has been retrieved to personal assistant application 600 prior to performing any of the actions associated with blocks 832-848, any information that the user adds via the actions associated with blocks 832-848 may be added to personal information, for the subject, cached/stored at personal assistant application 600 (e.g., stored in memory 504 or storage unit 506 of mobile device 218 that hosts personal assistant application 600). When the user selects the store option, the added information is sent to personal assistant server application 700, which incorporates the added information in the record corresponding to the subject.

If personal information of a subject has not been retrieved to personal assistant application 600 prior to performing any of the actions associated with blocks 832-848, when personal assistant application 600 sends the added information to personal assistant server application 700 to be saved, personal assistant server application 600 may search its database, find a record for the subject, and merge the added data into the record. If no matching record exists, personal assistant application 700 may create a new record to store the added data. In some implementation, personal assistant application 600 may prompt the user whether the user wishes to create a new database record. If the user indicates that the user does not wish to create a new record, personal assistant application 600/personal assistant server application 700 may not save the added data in a new record. From block 852, personal assistant application 600 may return to block 802.

As described above, personal assistant application 600 may identify a person that a user views or listens to using mobile device 218, on which personal assistant applicant 600 is installed. Personal assistant application 600 may obtain information about the person from personal assistant server application 700 and provide the information to the user on the display or speaker.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In another example, while a series of blocks have been described with regard to exemplary processes illustrated in various features, the order of the blocks in the figures may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, at a mobile device, user input for requesting personal information for a subject in proximity of the mobile device, wherein the user input includes a selection of a menu option of a plurality of menu options, and wherein the plurality of menu options includes a field device identifier option;
   selecting, by the mobile device and when the user input includes the field device identifier option, a function for obtaining the personal information using an identifier, by:
      scanning, by field device identifier logic of the mobile device and when the user input includes the field device identifier option, an area surrounding the mobile device to obtain a field device identifier;
      detecting, by the field device identifier logic of the mobile device, the field device identifier via a near field communication from another device that belongs to the subject;
      generating, by information request logic of the mobile device, a query that includes key data, wherein the key data includes the field device identifier, and wherein the query requests the personal information for the subject;
      sending, by the information request logic, the query to a remote device, wherein the remote device normalizes the field device identifier to format the field device identifier, and wherein the remote device is different from the mobile device and the other device; and
      receiving, from the remote device, the personal information for the subject in response to the query; and
   outputting, at the mobile device, the personal information to a display or as speech to a speaker.

2. The method of claim 1, wherein the plurality of menu options further includes an auto-detection option, the method further comprising:
   selecting, by the mobile device and when the menu option includes the auto-detection option, a second function for obtaining the personal information using location information that identifies a location of the mobile device, by:
      obtaining the location information from the mobile device;
      sending a second query, which includes the location information, to the remote device; and
      receiving, from the remote device, the personal information for the subject in response to the second query.

3. The method of claim 2, wherein the location information includes at least one of:
   physical coordinates of the mobile device; or
   orientation of the mobile device.

4. The method of claim 1, wherein the plurality of menu options further includes a face image option and a voice option, and wherein the method further comprises:
   selecting, by the mobile device and when the user input includes the face image option, a third function for obtaining personal information using the identifier, by:
      sending, from the mobile device, a third query that includes the identifier to the remote device in a first network, wherein the identifier was obtained by either the mobile device or a peripheral of the mobile device, by:
         capturing an image of a face of the subject,
         sending a fourth query that includes the captured image of the face to a second remote device in a second network, and
         receiving the identifier from the second remote device in response to the fourth query; and
      receiving, from the remote device, the personal information for the subject in response to the third query; and
   selecting, by the mobile device and when the user input includes the voice option, a fourth function for obtaining the personal information using the identifier, by:
      sending, from the mobile device, a fifth query that includes the identifier to the remote device, wherein the identifier was obtained by either the mobile device or the peripheral of the mobile device, by:
         sampling a voice of the subject to obtain voice data,
         sending a sixth query that includes the voice data to the second remote device,
         receiving, from the second remote device, the identifier in response to the sixth query; and
      receiving, from the second remote device, the personal information for the subject in response to the fourth query.

5. The method of claim 4, wherein the capturing the image of the face of the subject includes:
   capturing the image of the face of the subject by the peripheral.

6. The method of claim 5, wherein the peripheral includes:
   a headset; or a wearable computer.

7. The method of claim 6, wherein the identifier was obtained by the peripheral of the mobile device.

8. The method of claim 1, wherein the plurality of menu options further includes a data input option to input data, wherein the data includes one or more of:
   a device identifier associated with a particular remote device carried by the subject;
   a face image of the subject;
   voice data based on voice of the subject; or
   personal information.

9. A system comprising:
   a mobile device configured to:
      receive user input for requesting personal information for a subject in proximity of the mobile device, wherein the user input includes a selection of a menu option of a plurality of menu options, and wherein the plurality of menu options includes a field device identifier option;
      based on the user input, select one of available functions, wherein the functions include:
         a function configured to obtain the personal information using an identifier, wherein when obtaining the personal information, the function is configured to:
            scan, when the user input includes the field device identifier option, an area surrounding the mobile device to obtain a field device identifier;

detect the field device identifier via a near field communication from another device that belongs to the subject;
generate a query that includes key data, wherein the key data includes the field device identifier, and wherein the query requests information of the subject;
send the query to a remote device, wherein the remote device normalizes the field device identifier to format the field device identifier, and wherein the remote device is different from the mobile device and the other device; and
receive, from the remote device, the personal information for the subject in response to the query; and
output the personal information as an image to a display or as speech to a speaker.

10. The system of claim 9, wherein the mobile device includes:
a smart phone; a laptop computer; or a tablet computer.

11. The system of claim 9, further comprising a peripheral of the mobile device, wherein the identifier was obtained by the peripheral.

12. The system of claim 9, wherein the plurality of menu options further includes a face image option and a voice option and wherein the functions further include:
a second function configured to obtain the personal information using the identifier, wherein when obtaining the personal information, the second function is configured to:
send a second query that includes the identifier to the remote device, wherein the identifier was obtained by either the mobile device or a peripheral of the mobile device, by:
capturing an image of a face of the subject,
sending a third query that includes the captured image of the face to a second remote device, and
receiving the identifier from the second remote device in response to the third query; and
receive, from the remote device, the personal information for the subject in response to the second query;
a third function configured to obtain the personal information using the identifier, wherein when obtaining the personal information, the third function is configured to:
send a fourth query that includes the identifier to the remote device, wherein the identifier was obtained by either the mobile device or the peripheral of the mobile device, by:
sampling voice of the subject to obtain voice data, and
sending a fifth query that includes the voice data to the second remote device, and
receiving, from the second remote device, the identifier in response to the fifth query; and
receive, from the remote device, the personal information for the subject in response to the fourth query.

13. The system of claim 12, further comprising the remote device, wherein the remote device is configured to:
receive the second query;
perform a database lookup of the personal information using the identifier in the second query as a key;
retrieve the personal information from the database lookup; and
send the personal information to the mobile device.

14. The system of claim 12, wherein the remote device is further configured to:

receive a sixth query that includes a second image of a face of another subject;
send a seventh query to the second remote device, wherein the seventh query includes the second image in the sixth query;
receive, from the second remote device, a second identifier associated with the other subject in response to the seventh query;
perform a database lookup of personal data for the other subject using the received second identifier as a key;
retrieve the personal data from the database lookup; and
send the personal data to the mobile device.

15. The system of claim 12, wherein the remote device is further configured to:
collect data pertaining to a person from one or more of:
social media sites;
content sites;
professional association sites; or
a campus directory; and
store the collected data in a record in a database in the second remote device.

16. The system of claim 15, wherein the remote device is further configured to:
collect location information for a device that belongs to the person; and
store the location information in the record in the database in the second remote device.

17. One or more non-transient computer-readable media, comprising instructions for execution by at least one processor, wherein the instructions, when executed by the at least one processor, cause the at least one processor to:
receive, at a mobile device, user input for requesting personal information for a subject in proximity of the mobile device, wherein the user input includes a selection of a menu option of a plurality of menu options, and wherein the plurality of menu options includes a field device identifier option;
based on the user input, by the mobile device, select one of available functions, wherein the functions include:
a function configured to obtain the personal information using an identifier, by:
scanning, when the user input includes the field device identifier option, an area surrounding the mobile device to obtain a field device identifier;
detecting the field device identifier via a near field communication from another device that belongs to the subject;
generating a query that includes key data, wherein the key data includes the field device identifier, and wherein the query requests the personal information for the subject;
sending the query to a remote device, wherein the remote device normalizes the field device identifier to format the field device identifier, and wherein the remote device is different from the mobile device and the other device; and
receiving, from the remote device, the personal information for the subject in response to the query; and
output, at the mobile device, the personal information as an image to a display or as speech to a speaker.

18. The one or more non-transient computer-readable media of claim 17, wherein the plurality of menu options includes an auto-detection option, and wherein the functions further include:

a second function configured to obtain the personal information using location information that identifies a location of the mobile device, by:
obtaining the location information from a component in the mobile device;
sending a second query, which includes the location information, to the remote device; and
receiving, from the remote device, the personal information for the subject in response to the second query.

19. The one or more non-transient computer-readable media of claim 17, comprising further instructions, when executed by the at least one processor, cause the at least one processor to:
receive, at the remote device, the query from the mobile device;
perform, at the remote device, a database lookup of the personal information using the identifier in the query as a key;
retrieve, at the remote device, the personal information from the database lookup; and
send the personal information from the remote device to the mobile device.

20. The one or more non-transient computer-readable media of claim 17, comprising further instructions, when executed by the at least one processor, cause the at least one processor to:
receive, at the remote device and from the mobile device, a third query that includes an image of a face of the subject;
send, from the remote device, a fourth query to a second remote device, wherein the third query includes the image in the third query;
receive, at the remote device and from the second remote device, the identifier associated with the subject in response to the fourth query;
perform, at the remote device, a database lookup of personal data for the subject using the received identifier as a key;
retrieve, at the remote device, the personal data from the database lookup; and
send the personal data from the remote device to the mobile device.

* * * * *